N. L. DOLPH AND P. O. REYNEAU.
CABLE CLAMP.
APPLICATION FILED MAR. 18, 1922.
1,437,230.
Patented Nov. 28, 1922.
2 SHEETS—SHEET 2.
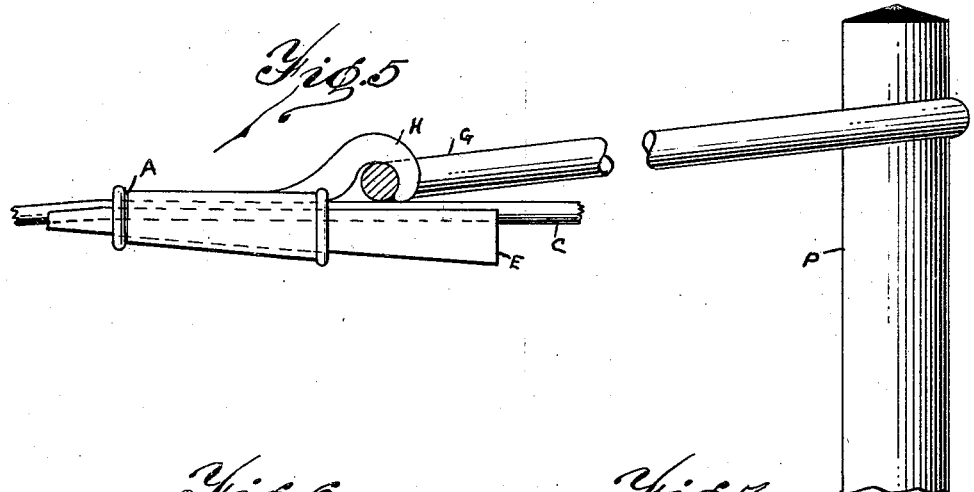
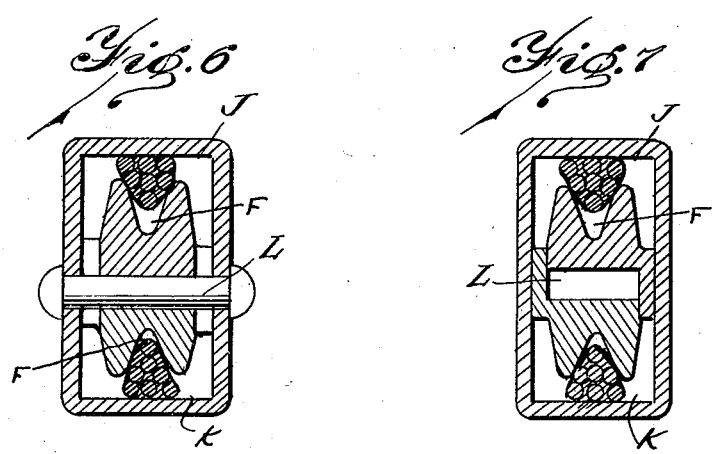
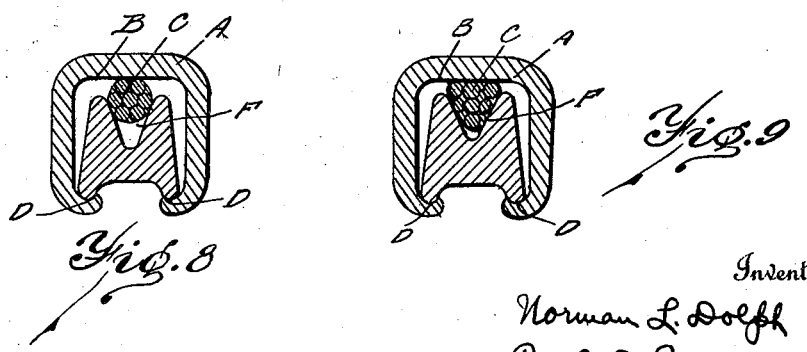
Inventors
Norman L. Dolph
Paul O. Reyneau
By William M. Swan
Attorney Patented Nov. 28, 1922.

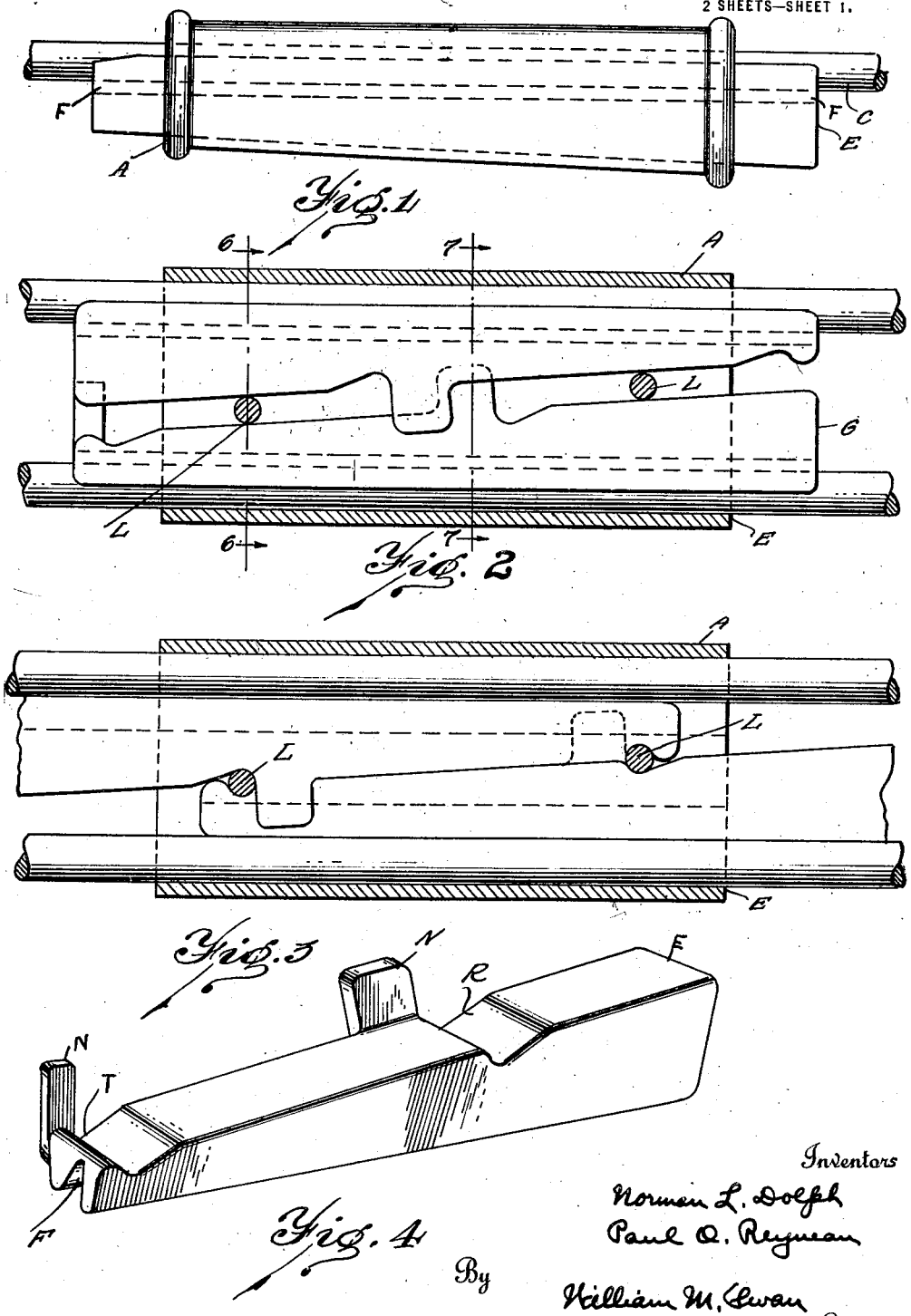

1,437,230

UNITED STATES PATENT OFFICE.

NORMAN L. DOLPH, OF FERNDALE VILLAGE, AND PAUL O. REYNEAU, OF BIRMINGHAM, MICHIGAN.

CABLE CLAMP.

Application filed March 18, 1922. Serial No. 544,760.

*To all whom it may concern:*

Be it known that we, NORMAN L. DOLPH and PAUL O. REYNEAU, citizens of the United States, residing, respectively, at Ferndale Village and Birmingham, county of Oakland, State of Michigan, have invented a certain new and useful Improvement in Cable Clamps, and declare the following to be a full, clear, and exact description of the same, such as will enable others skilled in the art to which it pertains to make and use the same, reference being had to the accompanying drawings, which form a part of this specification.

This invention relates to cable clamps, and has for its object an improved organization of parts, by means of which a cable may be firmly clamped against slippage, either singly or in doubled-over relation, as in the case of an oblique anchorage wire and its doubled-over free end, between which sections a looped portion is connected with a sunken ground anchor or the like.

In the drawings:

Figure 1 is a side elevational view, partly in dotted-in phantom, showing a clamp in position relatively to a single cable strand.

Figure 2 is a similar view of a double-acting clamp, each of whose wedge members acts upon its individual and adjacent cable length on the same principle as the single device illustrated in Figure 1.

Figure 3 is a similar elevational view to the showing in Figure 2, but without the cross rivets between the wedge members.

Figure 4 is a perspective of a preferred form of wedge.

Figure 5 is an elevational view illustrating the application of the single-acting type of wedge shown in Figure 1, to a link and hook connection of a cable-end to a wall or post.

Figure 6 is a sectional elevation taken along the line 6—6 of Figure 2, and looking in the direction of the arrows there shown.

Figure 7 is a similar elevation along the line 7—7 of Figure 2, and looking in the direction of the arrows there shown.

Figure 8 is a cross-sectional view of the construction shown in Figure 1 before the wedging action has forced the cable into distorted shape between the converging surfaces of the troughed side of the wedge.

Figure 9 is a similar cross-sectional view, illustrating the pinching of the cable to roughly triangular contour, as the wedge is driven lengthwise, due to the confining pressure of the holder and the convergence of the wedge surfaces.

A represents an open-ended shell, which may be either of generally rectangular cross-sectional outline or of general C-shaped cross-section, so as to have one side open. In the form of device illustrated in Figures 1, 5, 8 and 9, the shell is provided with a single longitudinally-extending bearing surface B for the cable C, which is located opposite the open side of the shell, against the under side of whose inturned edges D, the sloping surface of the wedge E is adapted to engage. As brought out particularly in Figures 4, 7, 8 and 9, the inner or cable-engaging side of the wedge is provided with a deep and sharply angular indentation F, which extends the length of the wedge; and after the cable has been placed within the shell, the wedge E is inserted at one end, so that the indented portion straddles the cable, which at the beginning, is, of course, of truly round contour. But being often of relatively soft metal, the cable, when increasingly pressed by the wedge as it travels lengthwise of the shell A, tends to distort the cable, not only by a slight flattening on the side facing the shell surface B. but as well by forcing the body or mass of the cable further into the sharply angular trough F, tending to fill the space toward the very apex of the trough, which, as long as the cable's round cross-sectional contour was unimpaired, remained unfilled, and also flattening the portions of the cable surface adjacent the tapering sides of the groove F, and thus increasing the net area per unit of length of the cable that is in active frictional engagement with the tapering sides. Dependent upon the degree of lengthwise strain, which it is designed to hold against, and upon the extent to which the distortion of the cable has been carried, a firm and relatively permanent frictional connection between the sides of the cable and the sloping sides of the groove or trough F, is effected, which renders the lengthwise pulling out of the cable difficult, if not impossible. And since the pull of such a connection upon the loop is always in the direction in which the wedge is driven for seating about the cable, the heavier the pull is, the more firmly the cable is seized.

As brought out in Figures 1 and 5, this type of connection is especially adapted for supporting a "dead end" from a wall or post, by means of the connection of the loop G with the hook H.

This idea may be profitably applied to the holding of both strands of a doubled-over cable, whose loop, for example, passes through the eye bolt of a ground anchor or about a post, as P, in Figure 5, and which it is desired to hold against slippage accordingly. In this case, it is sometimes preferable to use a shell or holding member of closed cross-sectional contour, with cable-engaging surfaces J and K, located at the ends of the greatest interior axis. Over each cable is then placed the sharply angular side of a wedge member, the sloping surface of each of which is adapted to engage the corresponding surface of the other, which enters the shell from the opposite end, as brought out in Figure 3. In the form shown in Figure 2 the inclined surfaces of the wedges are spaced apart by stationary transverse rivets L, against which the wedge faces act individually, though the action of each wedge relatively to its cable is the same. The steadily increasing pressure by the cooperating surface of the holder against the cable serves to force it into firmer and firmer frictional engagement of the sides sharply angular groove, which, we have found in practice, gives the best results as regards reception and frictional holding of the cable, if from 30 to 50 degrees in angular measurement, although, in principle, any angle less than a right angle would operate similarly.

What we claim is:

1. In a cable clamp, in combination with an open-ended holder provided with an internal cable-engaging surface, a longitudinally acute angularly grooved wedge member adapted to be driven lengthwise of said holder, thereby forcing a cable interposed between said cable-engaging surface and the grooved side of the wedge into frictional engagement with the acutely angular sides of the groove.

2. In a cable clamp, the combination, with an enclosing holder provided with an internal cable-engaging surface, of a wedge member provided with a longitudinal groove of sharply angular cross-section, with which said holder is adapted to co-operate in forcing an interposed cable into frictional engagement as the wedge is drawn lengthwise of the holder.

3. A cable clamp, having in combination with a wedge member of sharply re-entrant angular cross-section, a tubular holder relatively to which said wedge is adapted to be driven lengthwise, thereby forcing an interposed cable member into frictional engagement with the sides of the angular face of the wedge.

4. A cable clamp, having in combination with a wedge member having one face longitudinally grooved, the sides of the groove being sharply inclined toward one another, a tubular holder through which the wedge is adapted to be driven, thereby forcing a cable interposed between the grooved side of the wedge and the adjacent inner surface of the holder into frictional engagement with the sides of the groove in the wedge.

5. In combination with a tubular holder provided with an interiorly disposed cable-engaging surface, a sharply angularly grooved wedge member adapted to be driven lengthwise of said holder, thereby having forced into frictional engagement with the side of the groove a cable interposed between it and the adjacent cable-engaging surface of the holder.

6. In a cable clamp, in combination with wedge members, each of which is provided with a longitudinal groove of sharply angular cross-section, a shell provided with a plurality of interior cable-engaging surfaces, and transverse pin members, against which each of the wedge members may act to force the grooved side of the wedge into frictional engagement about the cable contained between it and the adjacent cable-engaging surface of the shell.

7. A cable clamp, having, in combination with a tubular holding member, a pair of wedge members, of sharply re-entrant angular cross-section, adapted to be driven lengthwise of the holding member from opposite ends thereof, with their wedge surfaces in frictional engagement with one another, thereby forcing cable lengths confined between the angular faces of the wedges and the adjacent inner surfaces of the holding member into frictional engagement with the sides of the angular faces of the wedges.

8. In a cable clamp, the combination with an open-ended tubular holder provided with a plurality of oppositely disposed cable-engaging surfaces, wedge members adapted to be driven lengthwise of said holder from opposite ends thereof, with their wedge surfaces in frictional engagement with one another, each of said wedge members being of sharply re-entrant angular cross-section for frictional engagement of its sides with opposite sides of its cable as the same is forced thereinto by the confining pressure of said holder.

9. In a cable clamp, in combination with a cable-engaging holder, wedge members adapted to be forced lengthwise thereof, with their wedge surfaces in frictional engagement with one another, each of said wedge members being of re-entrant angular cross-section, adapted to frictionally engage the cable with its sides as the cable is forced thereinto by the advance of the wedge lengthwise of the holder.

10. In combination with a tubular holder provided with oppositely disposed interior bearing surfaces, transverse pin members located between said bearing surfaces, and acute angularly grooved wedge members adapted to bear against said pin members as they are driven lengthwise of the holder, to effect the forcing of a cable, interposed between the grooved face of each and the adjacent cable-engaging surface of the opposing member, into frictional engagement with the acutely angular sides of the wedge's groove.

11. In a cable clamp, the combination with an open-ended shell having oppositely disposed interior faces against which lengths of cable are adapted to be rested, of a pair of cooperating wedge members adapted to be driven lengthwise of said shell and with their wedge surfaces in slidable engagement against one another that face of each wedge facing its complementary cable-engaging surface of the clamp being of sharply reentrant angular cross-section and being adapted to frictionally engage a cable between the sharply angular sides as the space between them and the complementary surface of the shell is diminished by the travel of each wedge lengthwise thereof.

In testimony whereof, we sign this specification in the presence of two witnesses.

NORMAN L. DOLPH.
PAUL O. REYNEAU.

Witnesses:
ARTHUR K. HURLBURT,
LILLIAN McDONALD.